United States Patent
Jitsukawa et al.

(10) Patent No.: US 10,721,718 B2
(45) Date of Patent: Jul. 21, 2020

(54) TRANSMISSION METHOD, BASE STATION APPARATUS, AND WIRELESS COMMUNICATION SYSTEM

(71) Applicant: FUJITSU LIMITED, Kawasaki-shi, Kanagawa (JP)

(72) Inventors: Daisuke Jitsukawa, Adachi (JP); Takashi Seyama, Kawasaki (JP); Takashi Dateki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/278,599

(22) Filed: Feb. 18, 2019

(65) Prior Publication Data

US 2019/0261321 A1 Aug. 22, 2019

(30) Foreign Application Priority Data

Feb. 19, 2018 (JP) .................................. 2018-027311

(51) Int. Cl.
*H04W 72/04* (2009.01)

(52) U.S. Cl.
CPC .................................. *H04W 72/04* (2013.01)

(58) Field of Classification Search
CPC ............. H04W 72/04; H04W 72/0406; H04W 72/0453; H04W 24/10; H04W 72/06;
(Continued)

(56) References Cited

U.S. PATENT DOCUMENTS

| 8,570,963 | B2 * | 10/2013 | Barany | .................. | H04B 7/024 370/329 |
| 8,934,559 | B2 * | 1/2015 | Tanaka | .................. | H04B 7/024 375/267 |

(Continued)

FOREIGN PATENT DOCUMENTS

| JP | 2011-019101 | | 1/2011 |
| JP | 2012013746 A | * | 1/2012 |

(Continued)

OTHER PUBLICATIONS

Jungnickel .V, et al., "Implementation concepts for distributed cooperative transmission", Signals, Systems and Computers, 2008 42nd Asilomar Conference on, IEEE, Piscataway, NJ, USA, Oct. 26, 2008, pp. 1035-1039, XP031475445, ISBN: 978-1-4244-2940-0. (Year: 2008).*

(Continued)

*Primary Examiner* — Afsar M Qureshi
(74) *Attorney, Agent, or Firm* — Fujitsu Patent Center

(57) ABSTRACT

A transmission method includes: selecting, from a cooperative cluster covered by a plurality of transmission points that transmit signals in cooperation with each other, a transmission point positioned in vicinity of a boundary between the cooperative cluster and another cooperative cluster; generating a first transmission weight that causes the selected transmission point to form a directional beam directed in a direction different from a direction of the another cooperative cluster; generating, by using the first transmission weight generated, a second transmission weight that weights transmission signals, such that signals that are transmitted simultaneously from the transmission points and addressed to a plurality of transmission destinations are separately received; generating, by using the second transmission weight generated, streams to be transmitted from the transmission points, the streams respectively corresponding to antennas; and transmitting the streams generated, from the transmission points.

6 Claims, 10 Drawing Sheets

(58) Field of Classification Search
CPC ... H04L 5/0035; H04L 5/0048; H04L 5/0053; H04L 5/006; H04B 7/065; H04B 7/024; H04B 7/063; H04B 7/066; H04B 7/0639
See application file for complete search history.

(56) References Cited

U.S. PATENT DOCUMENTS

| | | | | |
|---|---|---|---|---|
| 10,033,503 | B2* | 7/2018 | Liu | H04W 8/26 |
| 2011/0130160 | A1* | 6/2011 | Miyata | H04W 72/046 |
| | | | | 455/501 |
| 2012/0230264 | A1* | 9/2012 | Zhang | H04W 28/16 |
| | | | | 370/329 |
| 2013/0235819 | A1* | 9/2013 | Zhang | H04W 72/04 |
| | | | | 370/329 |
| 2014/0086082 | A1* | 3/2014 | Kim | H04B 17/345 |
| | | | | 370/252 |
| 2014/0211734 | A1* | 7/2014 | Seo | H04J 11/0056 |
| | | | | 370/329 |
| 2014/0321359 | A1* | 10/2014 | Seo | H04L 5/0057 |
| | | | | 370/328 |
| 2015/0009924 | A1* | 1/2015 | Takano | H04L 5/0035 |
| | | | | 370/329 |
| 2015/0341914 | A1* | 11/2015 | Lee | H04L 5/0096 |
| | | | | 370/329 |
| 2017/0195944 | A1* | 7/2017 | Luo | H04W 48/08 |
| 2019/0166610 | A1* | 5/2019 | Lee | H04W 72/046 |

FOREIGN PATENT DOCUMENTS

| | | | | |
|---|---|---|---|---|
| JP | 2014-027368 | | 2/2014 | |
| JP | 2017-011486 | | 1/2017 | |
| JP | 2017098997 | A * | 6/2017 | H04B 7/024 |

OTHER PUBLICATIONS

Qualcomm Europe: "Coordinated Multi-Point downlink transmission i n LTE-Advanced" 3GPP Draft; R1-084400 Comp, 3rd Generation ; Nov. 5, 2008, (Year: 2008).*

CATT: "The Procedure of the Downlink CoMP", 3GPP TSG RAN WG2 Meeting #67, R2-094331, Shenzhen, China, Aug. 24-28, 2009 (Year: 2009).*

* cited by examiner

FIG.7
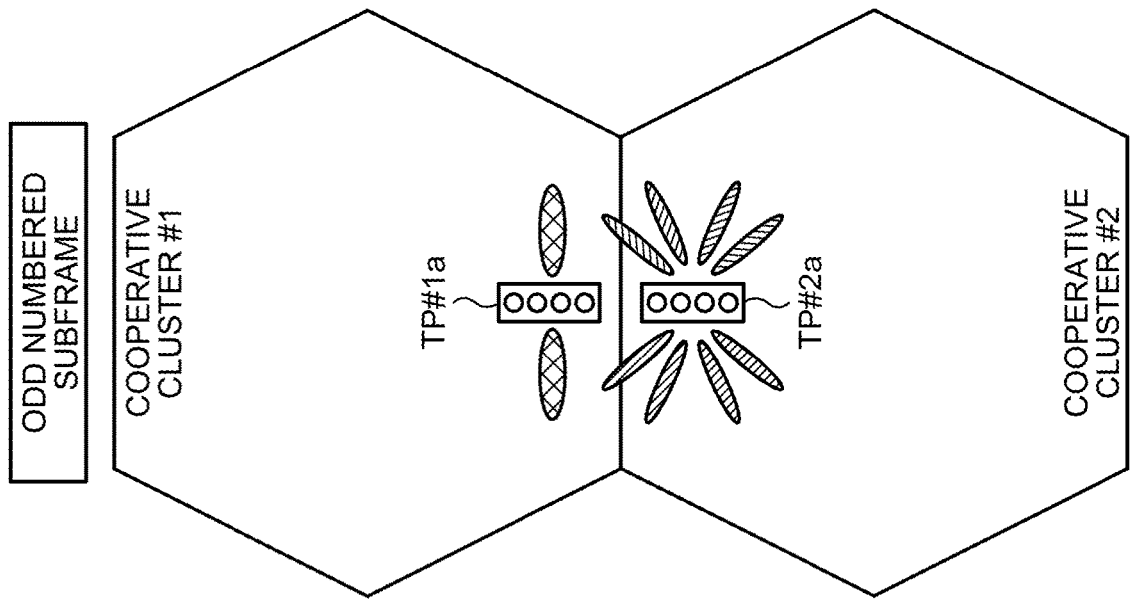
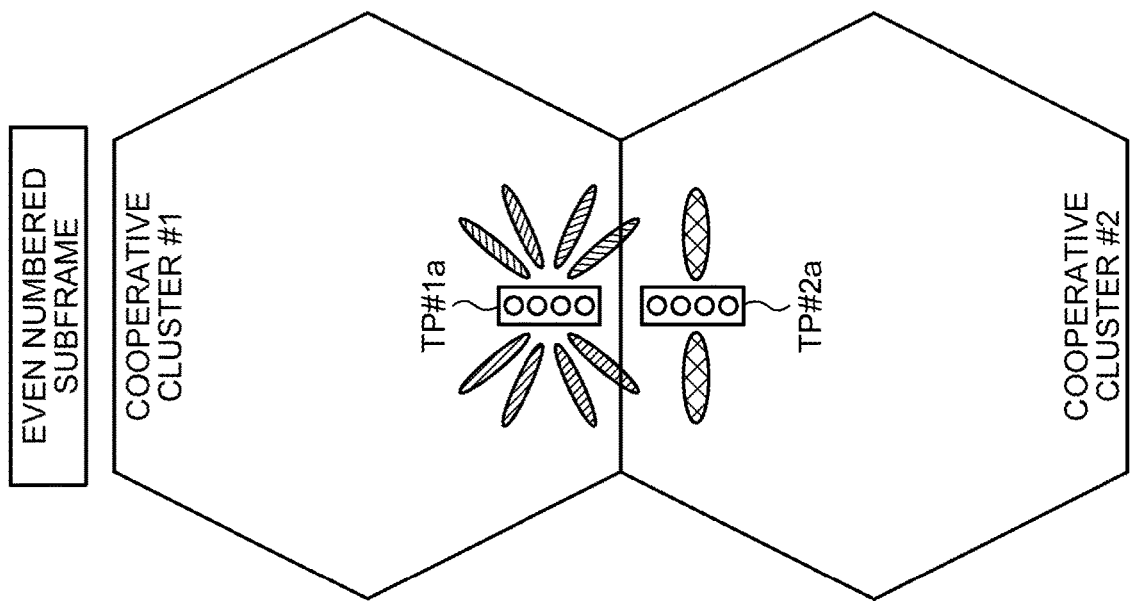

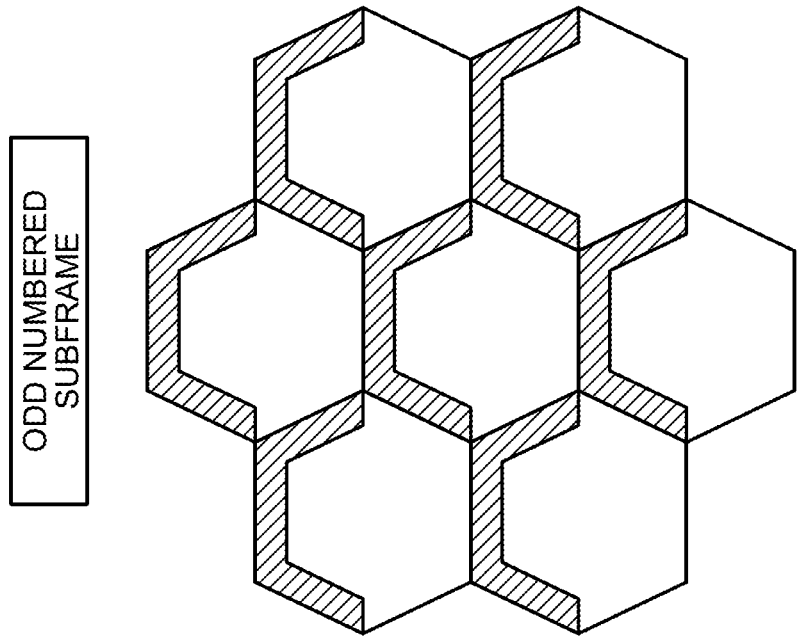
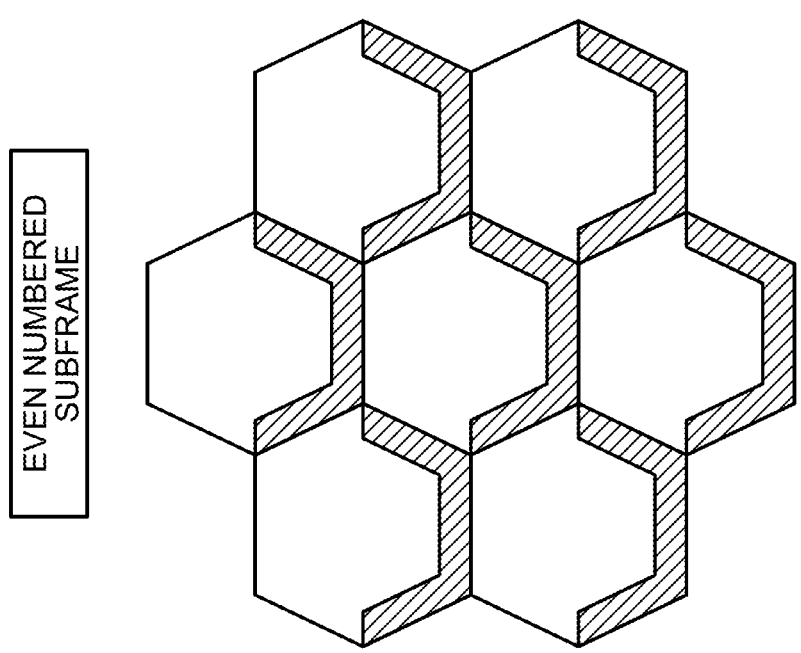
FIG.8

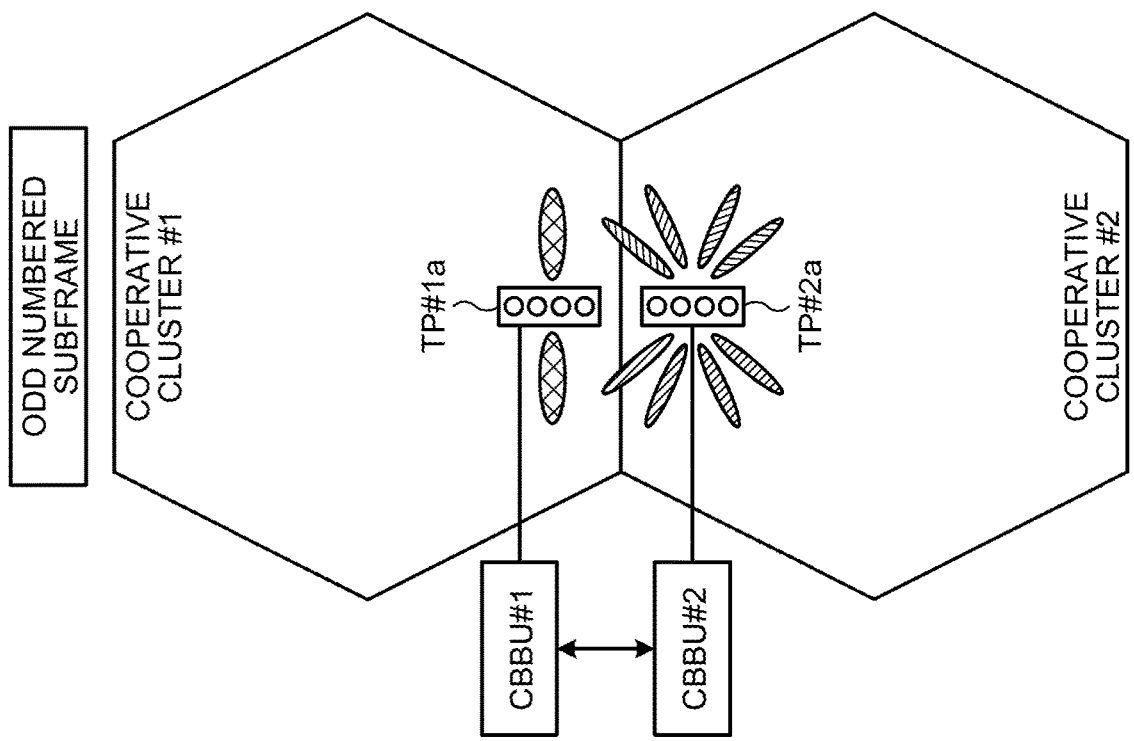
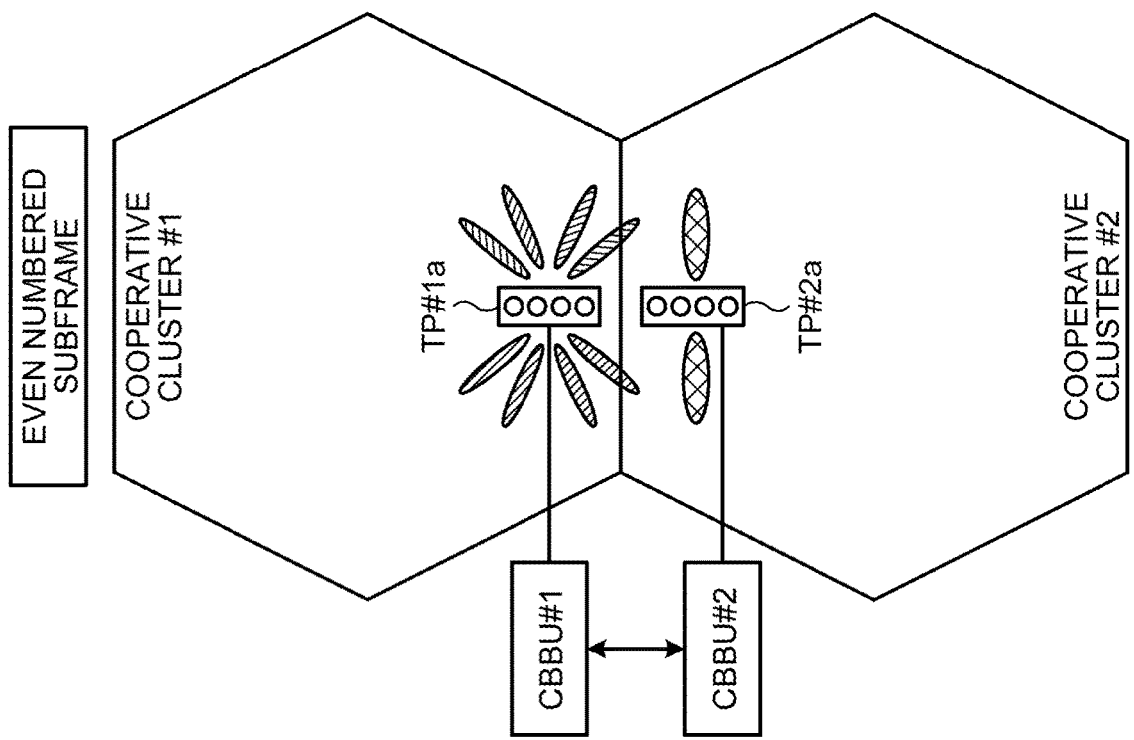
FIG.10

TRANSMISSION METHOD, BASE STATION APPARATUS, AND WIRELESS COMMUNICATION SYSTEM

CROSS-REFERENCE TO RELATED APPLICATION

This application is based upon and claims the benefit of priority of the prior Japanese Patent Application No. 2018-027311, filed on Feb. 19, 2018, the entire contents of which are incorporated herein by reference.

FIELD

The embodiments discussed herein are related to a transmission method, a base station apparatus, and a wireless communication system.

BACKGROUND

In recent years, mobile communication traffic has rapidly increased with the spread of smartphones and the like, and there is a pressing need for research and development of the fifth generation mobile communication system (5G), which is expected to be put into practical use in or after 2020. Improvement of the communication system capacity is one of abilities needed in 5G, and cooperative transmission from plural transmission points (TPs), for example, is a means for realizing this ability. Specifically, for example, cooperative transmission, which is realized by: highly close arrangement of TPs, such as remote radio heads (RRHs), in a high traffic area (a hot spot); and control of plural TPs from a centralized base band unit (CBBU), may be considered.

In general, improvement of the communication system capacity due to a gain of cell splitting is expected by highly close arrangement of TPs, but practically, because the probability that the propagation environment between each TP and user equipment (UE) will be a line of sight (LOS) environment is high, interference from peripheral TPs may be increased.

Accordingly, use of cooperative multi-user-multi-input-multi-output (MU-MIMO) transmission where plural TPs, which perform cooperative transmission, simultaneously transmit signals addressed to plural pieces of UE in an area (hereinafter, referred to as a "cooperative cluster") covered by the plural TPs may be considered. In cooperative MU-MIMO transmission, transmission weights are calculated based on estimation results of MIMO wireless channels between TPs and pieces of UE in a cooperative cluster, and transmission amplitudes and phases of antennas of the respective TPs are individually controlled by use of the transmission weights. Thereby, high communication system capacity according to the arrangement density of the TPs is able to be achieved ideally in a high quality communication environment where there is no interference between the TPs and between the pieces of UE.

Patent Literature 1: Japanese Laid-open Patent Publication No. 2011-19101
Patent Literature 2: Japanese Laid-open Patent Publication No. 2017-11486
Patent Literature 3: Japanese Laid-open Patent Publication No. 2014-27368

At most, the size of a cooperative cluster is limited to a range covered by TPs connected to a single CBBU, and is thus not limitless. Therefore, the following two techniques may be considered for a hot spot of a wide area, such as, for example, an overpopulated area, to be covered area-wise.

That is, according to the first techniques, a cooperative cluster is increased in size. In this case, station installation for connection between multiple TPs distributed over a wide area and a CBBU is difficult, and the amount of processing for scheduling and calculation of transmission weights is increased as the numbers of TPs and pieces of UE in the cooperative cluster are increased. Therefore, simply increasing the number of TPs that perform cooperative transmission to increase the size of the cooperative cluster is not realistic.

Thus, according to the second technique, plural cooperative clusters are closely arranged adjacently to each other. However, in this case, although no interference occurs between TPs in each cooperative cluster, there is a problem that interference occurs between TPs of cooperative clusters that are adjacent to each other. That is, interference between TPs occurs in the vicinity of a boundary between adjacent cooperative clusters, and the communication system capacity will be limited by this interference.

It has been known that normally: when a cooperative cluster is isolatedly arranged, by increase in the number of TPs in the cooperative cluster, the communication system capacity is able to be increased; but when plural cooperative clusters are closely arranged, even if the number of TPs in each cooperative cluster is increased, the communication system capacity is not increased much.

SUMMARY

According to an aspect of an embodiment, a transmission method includes: selecting, from a cooperative cluster covered by a plurality of transmission points that transmit signals in cooperation with each other, a transmission point positioned in vicinity of a boundary between the cooperative cluster and another cooperative cluster; generating a first transmission weight that causes the selected transmission point to form a directional beam directed in a direction different from a direction of the another cooperative cluster; generating, by using the first transmission weight generated, a second transmission weight that weights transmission signals, such that signals that are transmitted simultaneously from the transmission points and addressed to a plurality of transmission destinations are separately received; generating, by using the second transmission weight generated, streams to be transmitted from the transmission points, the streams respectively corresponding to antennas; and transmitting the streams generated, from the transmission points.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a specific example of interference reduction according to the second embodiment;

FIG. 8 is a diagram illustrating another specific example of the interference reduction according to the second embodiment;

FIG. 10 is a diagram illustrating a specific example of interference reduction according to the third embodiment.

DESCRIPTION OF EMBODIMENTS

Preferred embodiments of the present invention will be explained with reference to accompanying drawings. The present invention is not limited, through these embodiments.

[a] First Embodiment

Figure 1:
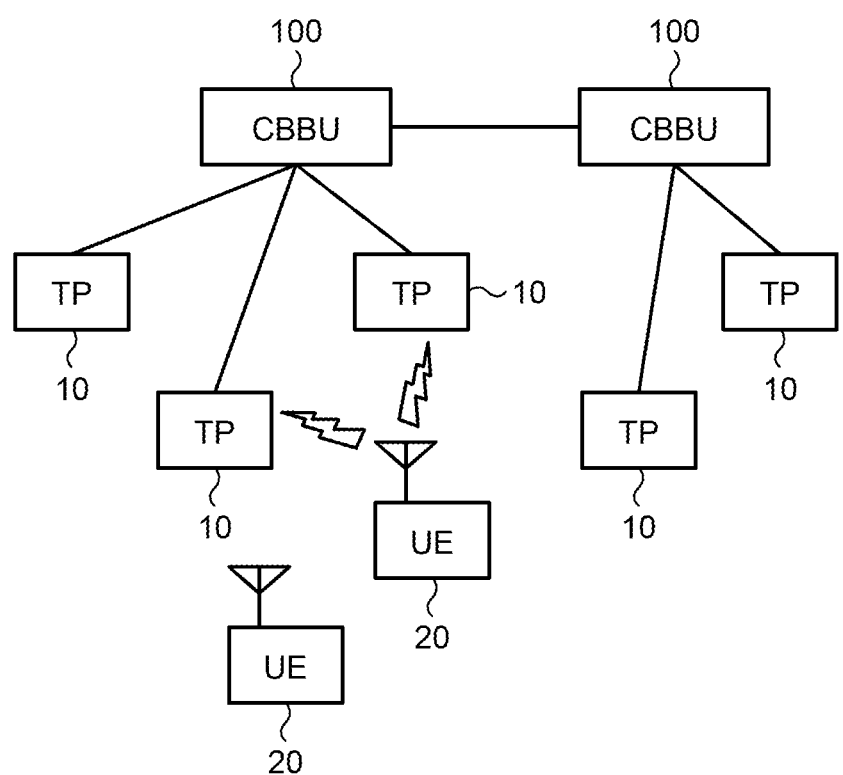
FIG. 1 is a diagram illustrating an example of a communication system according to a first embodiment.

FIG. 1 is a diagram illustrating an example of a communication system according to a first embodiment. In the communication system illustrated in FIG. 1, plural transmission points (TPs) 10 are connected to each centralized base band unit (CBBU) 100 that is a baseband processing device. The TPs 10 perform wireless communication with user equipment (UE) 20. As illustrated in FIG. 1, when plural CBBUs 100 are arranged, these CBBUs 100 are connected communicatably to each other.

The TPs 10 under the control of each of the CBBUs 100 transmit signals to the UE 20 by cooperative transmission. That is, a part or all of the TPs 10 connected to the CBBU 100 transmits/transmit signals addressed to the UE 20, in cooperation with each other. An area covered by the TPs 10 that perform the cooperative transmission is referred to as a cooperative cluster. The TPs 10 belonging to each cooperative cluster perform cooperative transmission by use of MU-MIMO. That is, plural TPs 10 in a cooperative cluster simultaneously transmit signals addressed to plural pieces of UE 20 by using the same frequency.

Specifically, the TPs 10 receive streams for respective antennas from the CBBU 100, the streams having been obtained by multiplication of data addressed to the plural pieces of UE 20 by a transmission weight for each cooperative cluster, and wirelessly transmit the streams respectively from their antennas. The transmission weight is a matrix corresponding to wireless propagation paths between the antennas of the TPs 10 in the cooperative cluster and the plural pieces of UE 20, and each piece of UE 20 is able to obtain a signal to that piece of UE 20 itself separately.

The CBBU 100 calculates, based on the wireless propagation paths between the antennas of the TPs 10 and the plural pieces of UE 20, a transmission weight for each cooperative cluster. However, for a TP (hereinafter, referred to as a "boundary TP") 10 that is positioned in the vicinity of a boundary between adjacent cooperative clusters, its transmission weight is calculated based on the assumption that the number of its antennas is less than the number of antennas that the TP 10 actually has. That is, the CBBU 100 regards the plural antennas that the boundary TP has as, for example, a single antenna that forms a directional beam (hereinafter, simply referred to as the "beam") and generates a transmission weight for MU-MIMO. The CBBU 100 generates this transmission weight such that a beam directed in the direction of the inside of the cooperative cluster is formed by the boundary TP. That is, the CBBU 100 reduces interference to the adjacent cooperative cluster by formation of a beam through the plural antennas that the boundary TP has, the beam being directed in a direction different from the direction of the adjacent cooperative cluster. Generation of the transmission weight by the CBBU 100 will be described in detail later.

Figure 2:
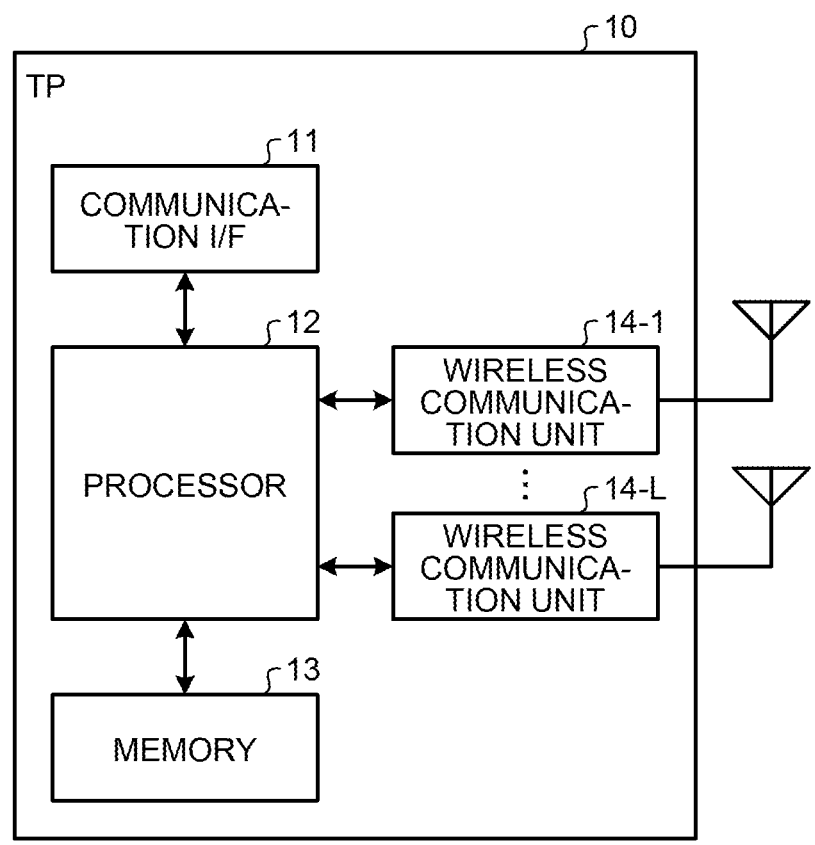
FIG. 2 is a block diagram illustrating a configuration of a TP according to the first embodiment.

FIG. 2 is a block diagram illustrating a configuration of the TP 10 according to the first embodiment. The TP 10 illustrated in FIG. 2 has a communication interface (hereinafter, abbreviated as the "communication I/F") 11, a processor 12, a memory 13, and plural wireless communication units 14-1 to 14-L (where L is an integer equal to or greater than 2).

The communication I/F 11 is connected to the CBBU 100, and receives transmitted data from the CBBU 100. The transmitted data include streams respectively for the plural antennas that the TP 10 has. Furthermore, the communication I/F 11 transmits received data, which have been received from the UE 20 by the plural antennas, to the CBBU 100.

The processor 12 includes, for example, a central processing unit (CPU), a field programmable gate array (FPGA), or a digital signal processor (DSP), and integrally controls the whole TP 10. Specifically, the processor 12 performs, for example, distortion compensation where the transmitted data received by the communication I/F 11 are multiplied by distortion characteristically inverse of distortion generated in an amplifier.

The memory 13 includes, for example, a random access memory (RAM) or a read only memory (ROM), and stores therein various information when processing is executed by the processor 12.

The wireless communication units 14-1 to 14-L are provided correspondingly to the plural antennas, and perform wireless transmission processing, such as D/A conversion and upconversion, on streams respectively transmitted from the antennas. Furthermore, the wireless communication units 14-1 to 14-L perform wireless reception processing, such as downconversion and A/D conversion, on signals respectively received by the antennas.

By the plural TPs 10 belonging to the same cooperative cluster transmitting the streams for the respective antennas from the plural antennas, MU-MIMO transmission where each of the plural pieces of UE 20 is able to receive data addressed to that piece of UE 20 itself is realized. Furthermore, by transmitting the streams for the respective antennas from the plural antennas, the boundary TP in the cooperative cluster forms a beam directed in a direction different from the direction of the adjacent cooperative cluster, and interference to the adjacent cooperative cluster is thereby reduced. As a result, even if plural cooperative clusters are closely arranged, interference between the cooperative clusters is reduced, and when MU-MIMO is applied to a wide area, the communication system capacity is able to be improved.

Figure 3:
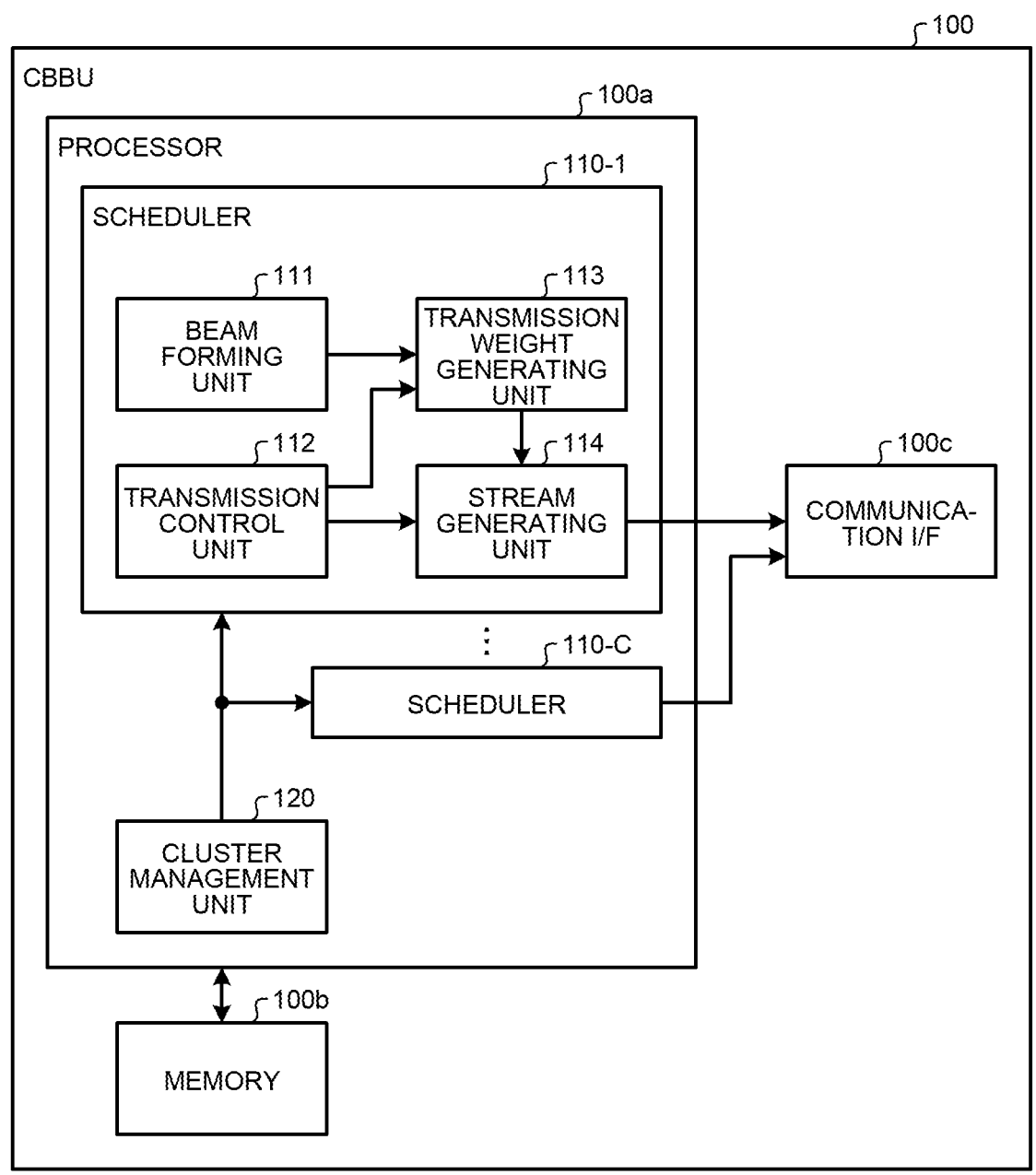
FIG. 3 is a block diagram illustrating a configuration of a CBBU according to the first embodiment.

FIG. 3 is a block diagram illustrating a configuration of the CBBU 100 according to the first embodiment. The CBBU 100 illustrated in FIG. 3 has a processor 100a, a memory 100b, and a communication I/F 100c.

The processor 100a includes, for example, a CPU, an FPGA, or a DSP, and integrally controls the whole CBBU 100. Specifically, the processor 100a has schedulers 110-1 to 110-C (where C is an integer equal to or greater than 1) respectively for the cooperative clusters, and a cluster management unit 120.

The schedulers 110-1 to 110-C are respectively provided for the cooperative clusters, and each have a beam forming unit 111, a transmission control unit 112, a transmission weight generating unit 113, and a stream generating unit 114. FIG. 3 illustrates the internal configuration of only the scheduler 110-1, but each of the other schedulers 110-2 to 110-C also has the same internal configuration as the scheduler 110-1.

The beam forming unit 111 selects a boundary TP from N TPs 10 (where N is an integer equal to or greater than 2) in the cooperative cluster, and form a beam for transmission of a signal from the boundary TP. Specifically, the beam forming unit 111 obtains positional information on positions where the TPs 10 in the cooperative cluster are installed, from, for example, the memory 100b, and selects a boundary TP that is positioned in the vicinity of the boundary from the adjacent cooperative cluster. The beam forming unit 111 may select, as a boundary TP, for example, a TP 10 that is within a predetermined distance from TPs 10 in the other cooperative cluster.

The beam forming unit 111 then generates a transmission weight vector that is multiplied by a stream of each of L antennas that the selected boundary TP has. For example, a transmission weight vector $W_n$ of a boundary TP#n (where n is an integer from 1 to N) is expressed by Equation (1) below.

$$W_n = [w_{n,1}, \ldots, w_{n,L}]^T \quad (1)$$
$$\text{where } w_{n,k} = e^{-j \cdot (k-1) \frac{2\pi}{\lambda} d \sin \theta}$$

In Equation (1) above, λ represents wavelength, d represents antenna element spacing of the boundary TP, and θ represents the emission direction of the main lobe of the beam. The beam forming unit 111 sets θ in Equation (1) above such that the beam for transmission of a signal by the boundary TP is directed in a direction different from that of the adjacent cooperative cluster. Upon this setting, the beam forming unit 111 preferably causes, not only the main lobe of the beam, but also side lobes thereof to be directed in a direction different from that of the adjacent cooperative cluster. The beam forming unit 111 may form the beam without using all of the L antennas that the boundary TP has, and thus may form the beam by using a part of the L antennas. The plural antennas used in the formation of the beam are regarded as a single antenna in generation of a transmission weight of MU-MIMO. That is, a part of freedom of control of amplitudes and phases for the respective antennas in MU-MIMO is assigned to the formation of the beam by the boundary TP.

The transmission control unit 112 executes scheduling within the cooperative cluster. Specifically, the transmission control unit 112 determines the pieces of UE 20 that are to be transmission destinations of data simultaneously in the cooperative cluster, and notifies the transmission weight generating unit 113 of results of this scheduling. That is, the transmission control unit 112 determines the plural pieces of UE 20 serving as the transmission destinations of data that are spatially multiplexed by MU-MIMO in the cooperative cluster.

The transmission control unit 112 determines these plural pieces of UE 20 such that the total number of antennas of the TPs 10 in the cooperative cluster equals the total number of antennas of the pieces of UE 20 serving as the transmission destinations of the data. Therefore, when every piece of UE 20 has one receiving antenna, the transmission control unit 112 decides to spatially multiplex data addressed to pieces of UE 20, the number of the pieces of UE 20 being equal to the total number of antennas of the TPs 10 in the cooperative cluster. However, the transmission control unit 112 counts the total number of antennas of the TPs 10 in the cooperative cluster by regarding the plural antennas used in the beam formation of the boundary TP as a single antenna.

Furthermore, the transmission control unit 112 generates data spatially multiplexed by MU-MIMO according to results of the scheduling. That is, the transmission control unit 112 generates data simultaneously transmitted and addressed to the plural pieces of UE 20 in the cooperative cluster, and outputs the data addressed to the respective pieces of UE 20, to the stream generating unit 114.

The transmission weight generating unit 113 generates, based on a downlink channel matrix between the N TPs 10 in the cooperative cluster and M pieces (where M is an integer equal to or greater than 2) of UE 20 determined by the scheduling, a transmission weight for MU-MIMO. Specifically, the transmission weight generating unit 113 defines a downlink equivalent channel matrix $H^\wedge_n$ between the TP#n in the cooperative cluster and the M pieces of UE 20 that are destinations of the spatially multiplexed data, as expressed by Equation (2) below.

$$H^\wedge_n = \begin{cases} H_n \cdot W_n = \begin{bmatrix} \sum_{i=1}^{L} h_{1,(n-1) \cdot L+i} \cdot W_{n,i} \\ \vdots \\ \sum_{i=1}^{L} h_{M,(n-1) \cdot L+i} \cdot W_{n,i} \end{bmatrix} & \text{(Boundary } TP\text{)} \\ H_n = \begin{bmatrix} h_{1,(n-1) \cdot L+1} & \cdots & h_{1,n \cdot L} \\ \vdots & \ddots & \vdots \\ h_{M,(n-1) \cdot L+1} & \cdots & h_{M,n \cdot L} \end{bmatrix} & \text{(Other } TP\text{)} \end{cases} \quad (2)$$

That is, for the TPs 10 other than the boundary TP, a channel matrix $H_n$, which has, arranged therein, respective downlink channel coefficients h between the L antennas of the TPs 10 and the M pieces of UE 20, serves as the downlink equivalent channel matrix. Furthermore, for the boundary TP, a matrix resulting from multiplication of the channel matrix $H_n$ by the transmission weight vector $W_n$ for beam formation serves as the downlink equivalent channel matrix.

The transmission weight generating unit 113 then finds an equivalent channel matrix H^ of the cooperative cluster having, arranged therein, the equivalent channel matrices $H^\wedge_n$ of the respective TPs 10, as expressed by Equation (3) below.

$$H^\wedge = [H^\wedge_1, \ldots, H^\wedge_N] \quad (3)$$

The transmission weight generating unit 113 calculates a transmission weight matrix in this cooperative cluster by using the equivalent channel matrix H^ of the cooperative cluster. That is, the transmission weight generating unit 113 finds, for example, a transmission weight matrix $W_{CL}$ by the zero forcing (ZF) method, by Equation (4) below.

$$W_{CL} = H^{\wedge H} \cdot (H^\wedge \cdot H^{\wedge H}) \quad (4)$$

In Equation (4) above, $H^{\wedge H}$ represents the Hermitian transpose of the equivalent channel matrix H^. The transmission weight generating unit 113 outputs the transmission weight matrix $W_{CL}$ generated, to the stream generating unit 114.

The stream generating unit 114 generates streams for the respective antennas of the TPs 10 in the cooperative cluster by multiplying the data output from the transmission control unit 112 and addressed to the UE 20 by the transmission weight matrix $W_{CL}$ output from the transmission weight generating unit 113. That is, a beam directed in a direction different from that of the adjacent cooperative cluster is generated for the boundary TP, and the stream generating unit 114 generates streams resulting from spatial multiplexing of data addressed to the M pieces of UE 20.

The cluster management unit 120 performs management of the cooperative clusters, and determines the TPs 10 belonging to each of the cooperative clusters. The cluster management unit 120 notifies the schedulers 110-1 to 110-C corresponding to the cooperative clusters, of the TPs 10 belonging to the cooperative clusters respectively.

The memory 100b includes, for example, a RAM or a ROM, and stores therein various information when processing is executed by the processor 100a.

The communication I/F 100c is connected to all of the TPs 10 under the control of the CBBU 100, and transmits the streams for the respective cooperative clusters respectively generated by the schedulers 110-1 to 110-C, to the TPs 10 of the cooperative clusters corresponding thereto. When these streams are simultaneously transmitted from the antennas of the respective TPs 10 in the cooperative clusters, downlink virtual channels according to the downlink channels between the transmitting and receiving antennas and the transmission weight matrices $W_{CL}$ have been orthogonalized for the respective pieces of UE 20, and each piece of UE 20 is able to receive the data addressed to that piece of UE 20 itself separately. Furthermore, for a boundary TP, a beam directed in a direction different from that of an adjacent cooperative cluster is generated, and interference to the adjacent cooperative cluster is able to be reduced.

Figure 4:
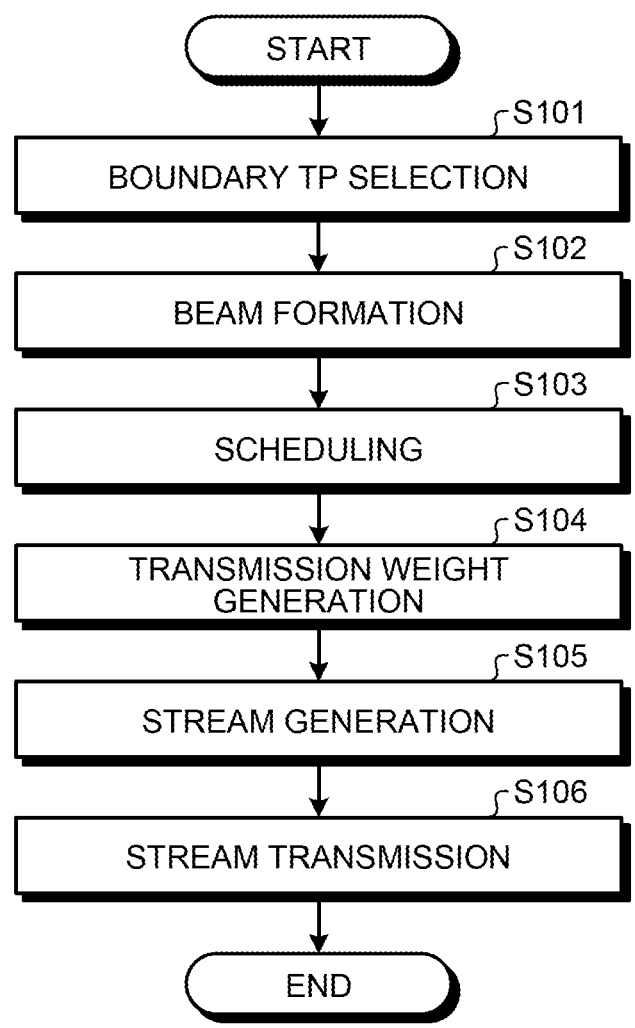
FIG. 4 is a flow diagram illustrating a transmission method according to the first embodiment.

Next, a method of transmission of data by the CBBU 100 configured as described above will be described while reference is made to a flow diagram illustrated in FIG. 4.

The memory 100b has positional information stored therein, the positional information being on all of the TPs 10 connected to the CBBU 100. Furthermore, the TPs 10 belonging to each of the cooperative clusters are determined by the cluster management unit 120, and the schedulers 110-1 to 110-C respectively corresponding to the cooperative clusters are notified of the TPs 10 of the cooperative clusters respectively.

In each of the schedulers 110-1 to 110-C respectively corresponding to the cooperative clusters, the beam forming unit 111 selects a boundary TP in that cooperative cluster (Step S101). That is, the beam forming unit 111 refers to the positional information on the TPs 10 and stored in the memory 100b, and selects a boundary TP in its own cooperative cluster, the boundary TP being a TP 10 that is within a predetermined distance from TPs 10 belonging to another cooperative cluster. The selected boundary TP is a TP 10 that may impart interference to the adjacent cooperative cluster.

The beam forming unit 111 thus forms a beam for reducing interference to the adjacent cooperative cluster from the boundary TP (Step S102). Specifically, the emission direction θ of the main lobe in Equation (1) above is appropriately set, and the transmission weight vector $W_n$ for beam generation is derived. This emission direction θ of the main lobe is set in a direction different from that of the adjacent cooperative cluster, such as, for example, the direction of the center of its own cooperative cluster. Furthermore, the emission direction θ of the main lobe is preferably set such that the direction of the side lobes formed with the main lobe are also in a direction different from that of the adjacent cooperative cluster. The transmission weight vector $W_n$ derived as described above is output to the transmission weight generating unit 113.

The transmission control unit 112, on the other hand, executes scheduling within the cooperative cluster (Step S103). That is, the M pieces of UE 20 serving as destinations of data spatially multiplexed by MU-MIMO within the cooperative cluster are determined. The transmission control unit 112 notifies the transmission weight generating unit 113, of the determined M pieces of UE 20. Furthermore, the transmission control unit 112 generates data addressed to the determined M pieces of UE 20, and outputs the generated data to the stream generating unit 114.

The transmission weight generating unit 113 generates a transmission weight, by which the data addressed to the M pieces of UE 20 are to be multiplied (Step S104). Specifically, firstly, for the TPs 10 other than the boundary TP, the channel matrix $H_n$ having, arranged therein, the channel coefficients between the transmitting and receiving antennas is found as the equivalent channel matrix $\hat{H}_n$, and for the boundary TP, a matrix resulting from multiplication of the channel matrix $H_n$ by the transmission weight vector $W_n$ is found as the equivalent channel matrix $\hat{H}_n$. From the equivalent channel matrix $\hat{H}$ of the cooperative cluster obtained by arrangement of the equivalent channel matrices $\hat{H}_n$ related to all of the TPs 10 in the cooperative cluster, the transmission weight matrix $W_{CL}$ is found by, for example, Equation (4) above.

The transmission weight is output to the stream generating unit 114, and a stream for each antenna of the TPs 10 in the cooperative cluster is generated by multiplication of the transmission weight by the data addressed to the M pieces of UE 20 (Step S105). The generated stream for each antenna is transmitted to the TP 10 that has that antenna, from the communication I/F 100c (Step S106). By the TPs 10 in the cooperative cluster simultaneously transmitting the streams to the respective antennas, the data addressed to the M pieces of UE 20 are spatially multiplexed and respectively received by the M pieces of UE 20. Since the streams for the respective antennas have been generated by multiplication of the data addressed to the respective pieces of UE 20 by the transmission weight, the downlink virtual channels related to the data for the respective pieces of UE 20 are orthogonalized, and each piece of UE 20 is able to receive the data to that piece of UE 20 itself separately from the other data.

Furthermore, since the transmission weight is generated so that the boundary TP forms a beam directed in a direction different from that of the adjacent cooperative cluster, transmission in the direction of the adjacent cooperative cluster is not performed in the vicinity of the boundary from the adjacent cooperative cluster. Therefore, interference to the adjacent cooperative cluster is reduced, and even if the cooperative clusters are closely arranged, the communication system capacity is able to be improved.

Figure 5:
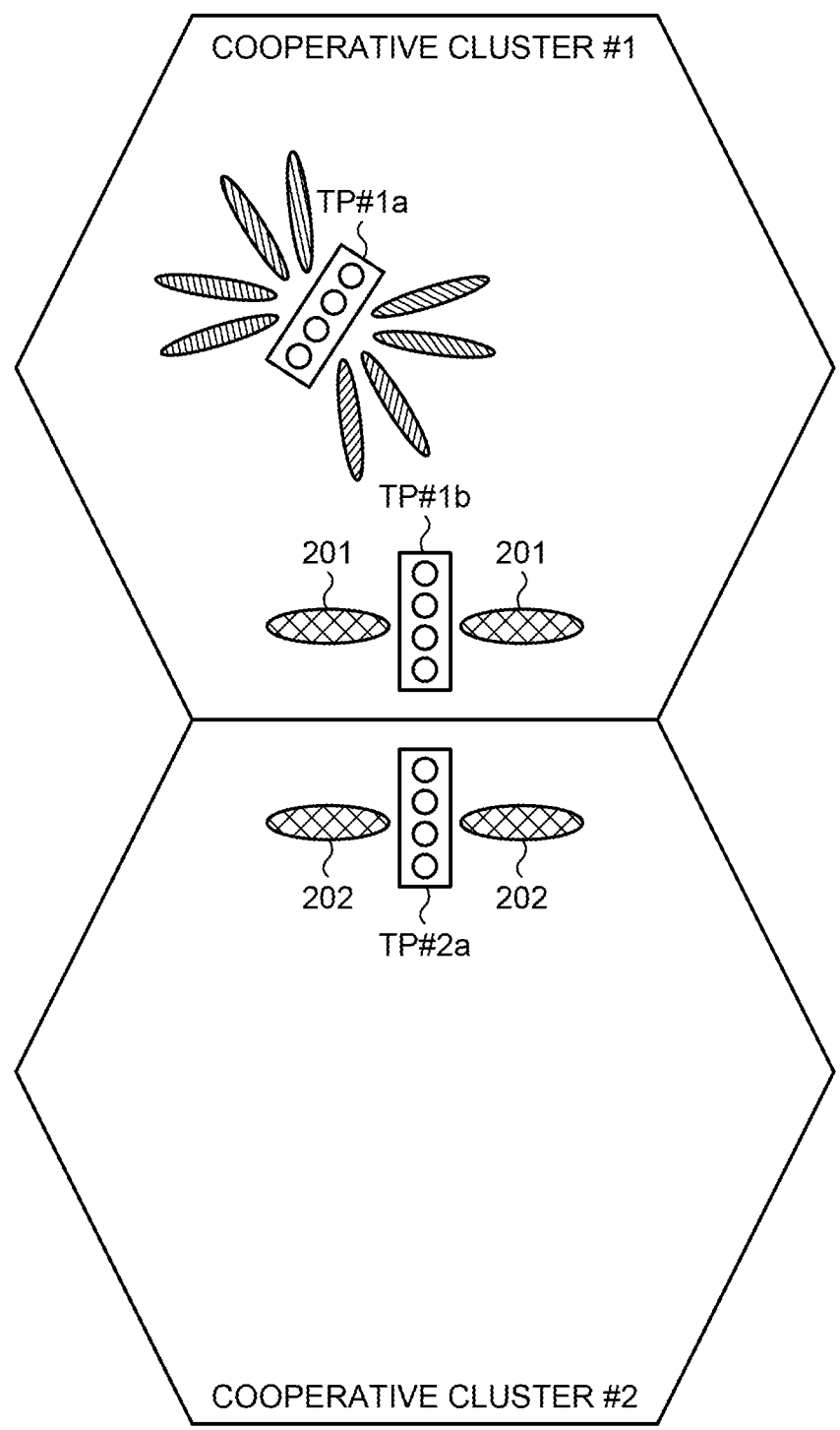
FIG. 5 is a diagram illustrating a specific example of interference reduction according to the first embodiment.

FIG. 5 is a diagram illustrating a specific example of interference reduction according to the first embodiment. In FIG. 5, a cooperative cluster #1 and a cooperative cluster #2 are adjacently arranged. A TP#1a and a TP#1b belong to the cooperative cluster #1, and a TP#2a belongs to the cooperative cluster #2.

While the TP#1a is positioned in the vicinity of the center of the cooperative cluster #1; the TP#1b is positioned in the vicinity of the boundary from the cooperative cluster #2, and thus is a boundary TP. Similarly, since the TP#2a is positioned in the vicinity of the boundary from the cooperative cluster #1, the TP#2a is a boundary TP. In this case, while the amplitude and phase are controlled for MU-MIMO with respect to all of antennas of the TP#1a, freedom of control of the amplitude and phase of all or a part of antennas of each of the TP#1b and TP#2a is assigned to beam formation. That is, the data addressed to the M pieces of UE 20 are multiplied by the above described transmission weight matrix $W_{CL}$, and streams for the respective antennas are generated.

As a result, while the TP#1a transmits data in all directions, each of the TP#1b and TP#2a transmits data in a direction different from that of its adjacent cooperative cluster. That is, the TP#1b generates a beam 201, and the TP#2a generates a beam 202. Since each of these beams 201 and 202 is directed in a direction different from that of the adjacent cooperative cluster, the interference imparted to the adjacent cooperative clusters by the TP#1b and TP#2a that are the boundary TPs is reduced. As a result, the interference between the cooperative clusters is reduced, and the communication system capacity in each of the cooperative clusters is able to be improved.

As described above, according to this embodiment, in a CBBU, a boundary TP in the vicinity of a boundary from an adjacent cooperative cluster generates a beam, and a transmission weight realizing MU-MIMO enabling simultaneous transmission of data addressed to plural pieces of UE is generated, and a stream for each antenna is thus generated. TPs in the cooperative cluster receive a stream for each antenna from the CBBU, and wirelessly transmit the stream from each antenna. Therefore, the boundary TP generates a beam directed in a direction different from that of the adjacent cooperative cluster, and interference to the adjacent cooperative cluster is thereby able to be reduced. As a result, when MU-MIMO is applied to a wide area having cooperative clusters closely arranged therein, the communication system capacity is able to be improved.

[b] Second Embodiment

A second embodiment is characterized in that a boundary TP that forms a beam is changed according to a wireless resource, such as time or frequency.

Configurations of a communication system, the TPs 10, and the CBBUs 100, according to the second embodiment are the same as those according to first embodiment, and thus description thereof will be omitted. Operation of the schedulers 110-1 to 110-C and cluster management unit 120 of the CBBU 100, according to the second embodiment, is different from that according to the first embodiment.

According to the second embodiment, the cluster management unit 120 changes, for each wireless resource, whether or not to cause a boundary TP to form a beam. That is, the cluster management unit 120 instructs the schedulers 110-1 to 110-C, per unit time, such as, for example, subframe, whether or not formation of beams by boundary TPs in the respective cooperative clusters is to be performed. Specifically, for example, the cluster management unit 120 causes a boundary TP of a certain cooperative cluster to form a beam for an even-number-th subframe, and causes a boundary TP of a cooperative cluster adjacent thereto to form a beam in an odd-number-th subframe. Furthermore, the cluster management unit 120 may instruct the schedulers 110-1 to 110-C, per unit frequency, such as, for example, subcarrier, whether or not formation of beams by boundary TPs in the respective cooperative clusters is to be performed.

The beam forming unit 111 of each of the schedulers 110-1 to 110-C forms a beam of a boundary TP for a wireless resource designated by the cluster management unit 120. That is, the beam forming unit 111 forms a beam of a boundary TP, for example, per subframe or per subcarrier. Therefore, the beam forming unit 111 forms a beam for a part of the wireless resources, and does not form a beam for the remaining wireless resources. As a result, for a wireless resource where a beam is not formed, the transmission weight generating unit 113 is able to generate a transmission weight for MU-MIMO by use of antennas of all of the TPs 10 including the boundary TP in that cooperative cluster. Thereby, since the boundary TP does not form a beam for a part of the wireless resources, reception quality at UE 20 in the vicinity of an outer edge of the cooperative cluster is improved. Therefore, for a wireless resource where the boundary TP does not form a beam, the transmission control unit 112 may execute scheduling such that data to the UE 20 in the vicinity of the outer edge of the cooperative cluster are transmitted.

Figure 6:
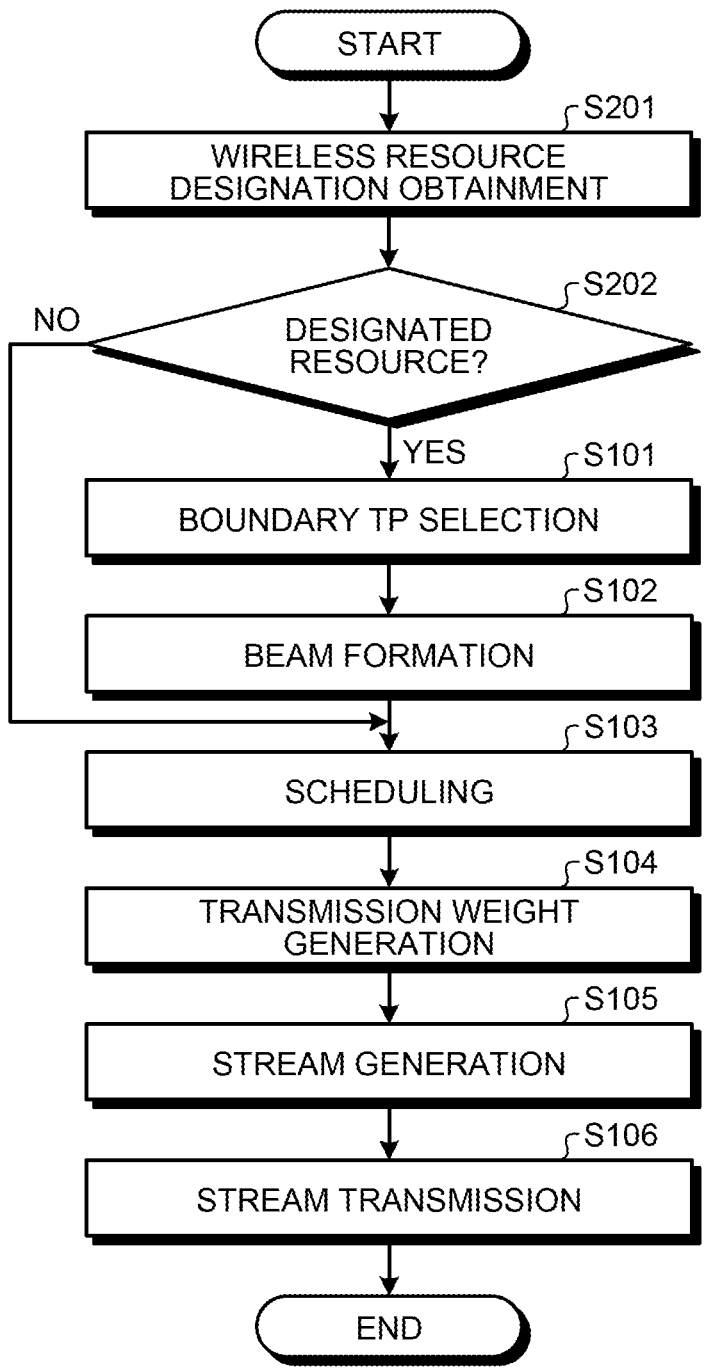
FIG. 6 is a flow diagram illustrating a transmission method according to a second embodiment.

Next, a method of transmission of data by the CBBU 100 according to the second embodiment will be described while reference is made to a flow diagram illustrated in FIG. 6. In FIG. 6, the same reference signs have been assigned to portions that are the same as those in FIG. 4, and description thereof will be omitted.

The cluster management unit 120 designates, to the schedulers 110-1 to 110-C, wireless resources, for which boundary TPs are caused to form beams in their respective cooperative clusters. That is, for example, the cluster management unit 120 instructs the schedulers 110-1 to 110-C corresponding to a part of cooperative clusters to form beams in even-number-th subframes, and instructs the schedulers 110-1 to 110-C corresponding to cooperative clusters adjacent to the part of the cooperative clusters to form beams in odd-number-th subframes. This instruction is obtained by the beam forming unit 111 of each of the schedulers 110-1 to 110-C corresponding to the respective cooperative clusters (Step S201).

The beam forming unit 111 then determines whether or not a wireless resource to be scheduled is a wireless resource that has been designated by the cluster management unit 120 (Step S202). That is, if, for example, it has been instructed that beams are to be formed in even-number-th subframes, the beam forming unit 111 determines whether or not a subframe to be scheduled is an even-number-th subframe. Furthermore, if, for example, a frequency of a subcarrier where a beam is to be formed has been designated, the beam forming unit 111 determines whether or not a subcarrier to be scheduled is the subcarrier of the designated frequency.

If, as a result of this determination, the wireless resource to be scheduled is the designated wireless resource (Step S202: Yes), the beam forming unit 111 selects a boundary TP in the cooperative cluster (Step S101), and forms a beam for reducing interference to an adjacent cooperative cluster (Step S102). Similarly to the first embodiment, scheduling in the cooperative cluster is then executed (Step S103), and the transmission weight generating unit 113 generates a transmission weight (Step S104). The transmission weight generated then is a transmission weight for the boundary TP to form a beam. By use of the transmission weight, streams for respective antennas are then generated (Step S105), and the streams are transmitted to the respective TPs 10 including the boundary TP (Step S106).

On the contrary, if, as a result of the determination at Step S202, the wireless resource to be scheduled is not the designated wireless resource (Step S202: No), formation of a beam is omitted for this wireless resource. Therefore, scheduling in the cooperative cluster is executed without formation of a beam in the boundary TP (Step S103), and the transmission weight generating unit 113 generates a transmission weight (Step S104). The transmission weight generated then is a transmission weight for the boundary TP to not form a beam. By use of the transmission weight, streams for the respective antennas are then generated (Step S105), and the streams are transmitted to the respective TPs 10 (Step S106).

As described above, since whether or not a beam is formed by a boundary TP differs according to each wireless resource, interference to an adjacent cooperative cluster is reduced for a wireless resource where a beam is formed, and reception quality of the UE 20 positioned in the vicinity of an outer edge of the cooperative cluster is able to be improved for a wireless resource where a beam is not formed.

FIG. 7 is a diagram illustrating a specific example of interference reduction according to the second embodiment. In FIG. 7, the cooperative cluster #1 and cooperative cluster #2 are adjacently arranged. The TP#1a belongs to the cooperative cluster #1, and the TP#2a belongs to the cooperative cluster #2. The TP#1a and TP#2a are both boundary TPs in their respective cooperative clusters.

As illustrated in the figure on the left in FIG. 7, in an even-number-th subframe, while the TP#1a in the cooperative cluster #1 does not form a beam, the TP#2a in the cooperative cluster #2 forms a beam. Therefore, in the even-number-th subframe, interference from the cooperative cluster #2 to the cooperative cluster #1 is reduced. Furthermore, in the cooperative cluster #1, since MU-MIMO is executed by inclusion of antennas of the TP#1a that is a boundary TP, reception quality of UE 20 positioned in the vicinity of a boundary from the cooperative cluster #2 is improved.

As illustrated in the figure on the right in FIG. 7, in an odd-number-th subframe, while the TP#1a in the cooperative cluster #1 forms a beam, the TP#2a in the cooperative cluster #2 does not form a beam. Therefore, in the even-number-th subframe, interference from the cooperative cluster #1 to the cooperative cluster #2 is reduced. Furthermore, in the cooperative cluster #2, since MU-MIMO is executed by inclusion of antennas of the TP#2a that is a boundary TP, reception quality of UE 20 positioned in the vicinity of the boundary from the cooperative cluster #1 is improved.

As described above, according to this embodiment, a CBBU generates a transmission weight for MU-MIMO by changing, for each wireless resource, whether or not to cause a boundary TP of each cooperative cluster to form a beam, and generates a stream for each antenna. TPs in a cooperative cluster receive the streams for the respective antennas from the CBBU, and wirelessly transmit the streams from the respective antennas. Therefore, for a part of wireless resources, a boundary TP forms a beam and interference to an adjacent cooperative cluster is able to be reduced, and in the remaining wireless resources, MU-MIMO is executed without formation of a beam by the boundary TP, and reception quality at UE in the vicinity of an outer edge of that cooperative cluster is able to be improved. As a result, when MU-MIMO is applied to a wide area where cooperative clusters are closely arranged, the communication system capacity is able to be improved.

In the above described second embodiment, whether or not a beam is to be formed by a boundary TP is changed in units of cooperative clusters, but whether or not a beam is to be formed may be not the same for all of boundary TPs belonging to a cooperative cluster. That is, for certain wireless resources, a part of boundary TPs in a cooperative cluster may be selected and beams may be formed thereby, and for the remaining wireless resources, another part of the boundary TPs may be selected and beams may be formed thereby.

FIG. 8 is a diagram illustrating a specific example of beam formation per subframe. In FIG. 8, cooperative clusters represented by hexagons in the figure have been closely arranged. As illustrated in the figure on the left in FIG. 8, in an even-number-th subframe, any boundary TP that is in a range of each cooperative cluster forms a beam, the range having been shaded with oblique lines in the figure. That is, in the even-number-th subframe, any boundary TP on one side (lower side in the figure) of the center line of each cooperative cluster forms a beam. Furthermore, as illustrated in the figure on the right in FIG. 8, in an odd-number-th subframe, any boundary TP that is in a range of each cooperative cluster forms a beam, the range having been shaded with oblique lines in the figure. That is, in the odd-number-th subframe, any boundary TP on the other side (upper side in the figure) of the center line of each cooperative cluster forms a beam.

As a result, in each of adjacent cooperative clusters, reduction of interference and reception quality improvement of UE in the vicinity of an outer edge thereof are able to be realized time-divisionally.

[c] Third Embodiment

A third embodiment is characterized in that when cooperative clusters adjacent to each other are cooperative clusters under the control of different CBBUs, whether or not a beam is to be formed by a boundary TP is changed per wireless resource.

Figure 9:
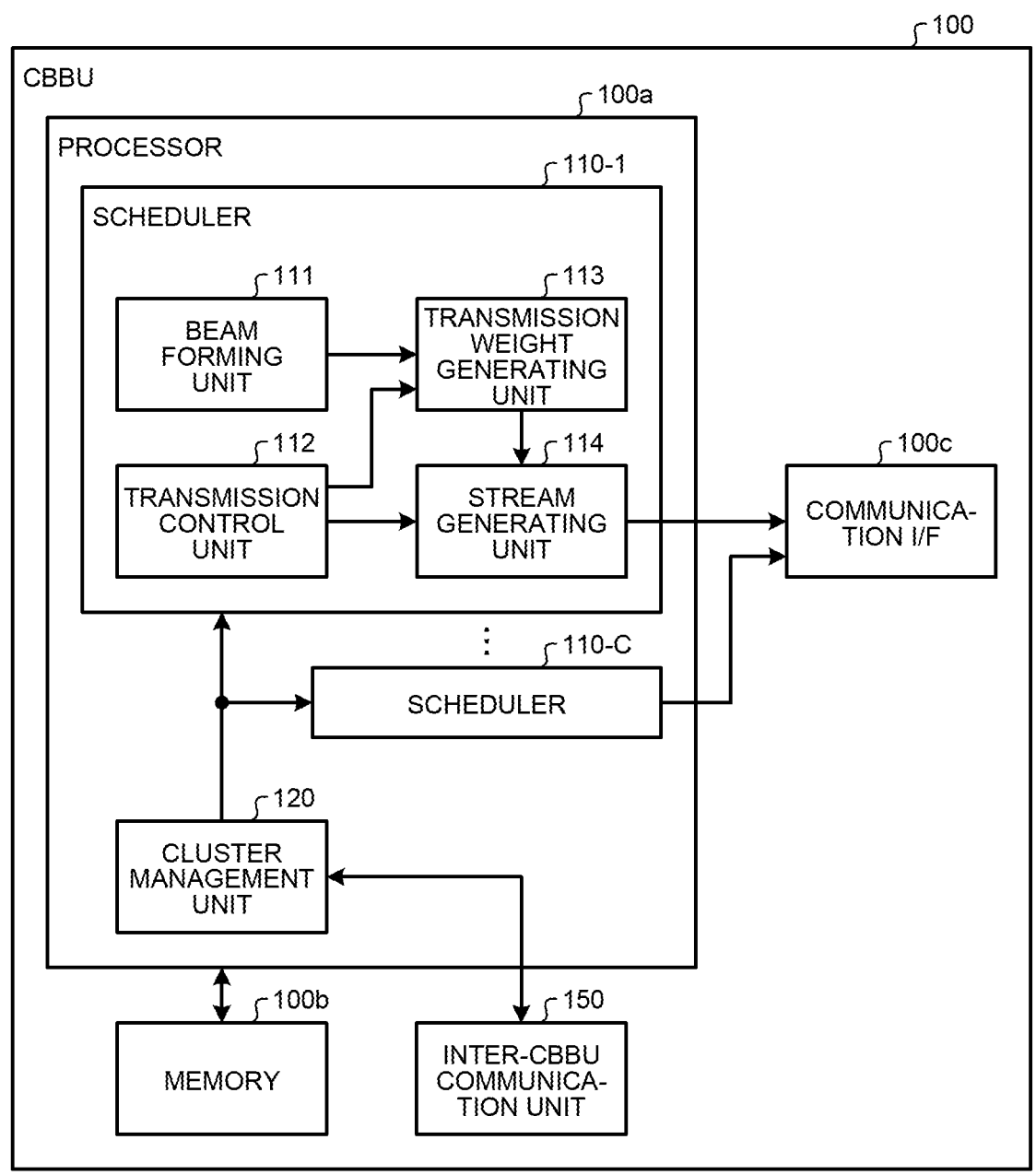
FIG. 9 is a block diagram illustrating a CBBU according to a third embodiment.

Configurations of a communication system and TPs 10, according to the third embodiment, are the same as those according to first embodiment, and thus description thereof will be omitted. FIG. 9 is a block diagram illustrating a configuration of a CBBU 100 according to the third embodiment. In FIG. 9, the same reference signs have been assigned to portions that are the same as those in FIG. 3, and description thereof will be omitted. The CBBU 100 illustrated in FIG. 9 has a configuration having an inter CBBU communication unit 150 in addition to the CBBU 100 illustrated in FIG. 3.

The inter CBBU communication unit 150 is connected to another CBBU, and transmits and receives information related to cooperative clusters. That is, the inter CBBU communication unit 150 transmits, to the other CBBU, information on wireless resources where a boundary TP belonging to a cooperative cluster under the control of its own CBBU forms a beam, and receives, from the other CBBU, information on wireless resources where a boundary TP belonging to a cooperative cluster under the control of the other CBBU forms a beam. The information transmitted and received by the inter CBBU communication unit 150 may include positional information of TPs 10 belonging to each cooperative cluster, and identification information of the boundary TP belonging to each cooperative cluster.

According to this embodiment, the cluster management unit 120 determines wireless resources where the boundary TP forms a beam in the cooperative cluster under the control of its own CBBU, by using the information received from the other CBBU by the inter CBBU communication unit 150. That is, if a cooperative cluster adjacent to the cooperative cluster under the control of its own CBBU is a cooperative cluster under the control of another CBBU, the cluster management unit 120 causes beams to be formed in wireless resources that are different between these cooperative clusters.

FIG. 10 is a diagram illustrating a specific example of interference reduction according to the third embodiment. In FIG. 10, the cooperative cluster #1 under the control of a CBBU#1 and the cooperative cluster #2 under the control of a CBBU#2 are adjacently arranged. The TP#1a belongs to the cooperative cluster #1 and the TP#2a belongs to the cooperative cluster #2. The TP#1a and TP#2a are both boundary TPs in their respective cooperative clusters.

As illustrated in the figure on the left in FIG. 10, by the CBBU#1 and CBBU#2 transmitting and receiving information to and from each other, in an even-number-th subframe, while the TP#1a in the cooperative cluster #1 does not form a beam, the TP#2a in the cooperative cluster #2 forms a beam. Therefore, in the even-number-th subframe, interference from the cooperative cluster #2 to the cooperative cluster #1 is reduced. Furthermore, in the cooperative cluster #1, since MU-MIMO is executed by inclusion of the antennas of the TP#1a that is a boundary TP, reception quality of UE 20 positioned in the vicinity of a boundary from the cooperative cluster #2 is improved.

Similarly, as illustrated in the figure on the right in FIG. 10, by the CBBU#1 and CBBU#2 transmitting and receiving information to and from each other, in an odd-number-th subframe, while the TP#1a in the cooperative cluster #1 forms a beam, the TP#2a in the cooperative cluster #2 does not form a beam. Therefore, in the odd-number-th subframe, interference from the cooperative cluster #1 to the cooperative cluster #2 is reduced. Furthermore, in the cooperative cluster #2, since MU-MIMO is executed by inclusion of the antennas of the TP#2a that is a boundary TP, reception quality of UE 20 positioned in the vicinity of the boundary from the cooperative cluster #1 is improved.

As described above, according to this embodiment, a CBBU changes whether or not a beam is to be formed by a boundary TP in each cooperative cluster per wireless resource, by transmitting and receiving information to and from another CBBU. The CBBU then generates a transmission weight for MU-MIMO according to whether or not beam formation is to be performed, and generates a stream for each antenna. Furthermore, TPs in a cooperative cluster receive the streams for the respective antennas from the CBBU, and wirelessly transmit the streams from the respective antennas. Therefore, even if an adjacent cooperative cluster is a cooperative cluster under the control of a different CBBU, a wireless resource where a boundary TP forms a beam in each of the cooperative clusters is able to be changed appropriately.

According to one aspect of a transmission method, a base station apparatus, and a wireless communication system, which are disclosed by this patent application, an effect of enabling the communication system capacity to be improved when MU-MIMO is applied to a wide area is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission method, including:
   selecting, from a cooperative cluster covered by a plurality of transmission points that transmit signals in cooperation with each other, a transmission point positioned in vicinity of a boundary between the cooperative cluster and another cooperative cluster;
   generating a first transmission weight that causes the selected transmission point to form a directional beam directed in a direction different from a direction of the another cooperative cluster;
   generating, by using the first transmission weight generated, a second transmission weight that weights transmission signals, such that signals that are transmitted simultaneously from the transmission points and addressed to a plurality of transmission destinations are separately received;
   generating, by using the second transmission weight generated, streams to be transmitted from the transmission points, the streams respectively corresponding to antennas; and
   transmitting the streams generated, from the transmission points.

2. The transmission method according to claim 1, wherein the generating the first transmission weight includes: omitting generating the first transmission weight in a wireless resource where a transmission point in the another cooperative cluster forms a directional beam; and generating the first transmission weight in another wireless resource different from the wireless resource.

3. The transmission method according to claim 1, wherein the selecting includes: selecting, for a part of wireless resources, a part of transmission points positioned in the vicinity of the boundary from the another cooperative cluster; and selecting, for another part of the wireless resources, another part of the transmission points.

4. A base station apparatus, comprising:
   a processor that executes a process including:
      selecting, from a cooperative cluster covered by a plurality of transmission points that transmit signals in cooperation with each other, a transmission point positioned in vicinity of a boundary between that cooperative cluster and another cooperative cluster;
      generating a first transmission weight that causes the selected transmission point to form a directional beam directed in a direction different from a direction of the another cooperative cluster;
      generating, by using the first transmission weight generated, a second transmission weight that weights transmission signals such that signals that are transmitted simultaneously from the transmission points and addressed to a plurality of transmission destinations are separately received; and
      generating, by using the second transmission weight generated, streams to be transmitted from the transmission points, the streams respectively corresponding to antennas; and
   a transmitter that transmits the streams generated.

5. The base station apparatus according to claim 4, further comprising:
   a transceiver that transmits and receives information related to a wireless resource where a directional beam is formed, to and from another base station apparatus corresponding to the another cooperative cluster, wherein
   the generating the first transmission weight includes determining, based on the information transmitted and received by the communication unit, a wireless resource where the first weight is generated.

6. A wireless communication system, comprising: a base station apparatus; and a plurality of transmission points that are connected to the base station apparatus and transmit signals in cooperation with each other, wherein
　the base station apparatus comprises:
　　a processor that executes a process including:
　　　selecting, from a cooperative cluster covered by the transmission points, a transmission point positioned in vicinity of a boundary between that cooperative cluster and another cooperative cluster;
　　　generating a first transmission weight that causes the selected transmission point to form a directional beam directed in a direction different from a direction of the another cooperative cluster;
　　　generating, by using the first transmission weight generated, a second transmission weight that weights transmission signals such that signals that are transmitted simultaneously from the transmission points and addressed to a plurality of transmission destinations are separately received;
　　　generating, by using the second transmission weight generated, streams to be transmitted from the transmission points, the streams respectively corresponding to antennas; and
　　a transmitter that transmits the streams generated, and
　each of the transmission points comprises:
　　a receiver that receives the streams transmitted from the base station apparatus; and
　　a wireless transmitter that wirelessly transmits the streams received by the receiver, respectively from the antennas.

\* \* \* \* \*